(12) United States Patent
Wen et al.

(10) Patent No.: US 7,177,355 B1
(45) Date of Patent: Feb. 13, 2007

(54) METHOD FOR REPRESENTING ENCODING UPON CODING INFORMATION

(75) Inventors: Jiangtao Wen, Los Angeles, CA (US); John D. Villasenor, Los Angeles, CA (US); Jeong-hoon Park, Seoul (KR)

(73) Assignees: Samsung Electronics Co., Ltd., Kyungki-do (KR); The Regents of the University of California, Oakland, CA (US)

( * ) Notice: Subject to any disclaimer, the term of this patent is extended or adjusted under 35 U.S.C. 154(b) by 524 days.

(21) Appl. No.: 09/203,672

(22) Filed: Dec. 1, 1998

Related U.S. Application Data

(60) Provisional application No. 60/067,014, filed on Dec. 1, 1997.

(51) Int. Cl.
*H04B 1/66* (2006.01)
(52) U.S. Cl. ............ 375/240; 375/240.26; 375/240.27; 375/240.23; 375/240.01; 382/235; 382/246
(58) Field of Classification Search ................ 348/416, 348/443, 423, 415, 419, 412, 420, 699; 382/243, 382/235, 238, 250, 246; 375/240, 240.16, 375/240.26, 240.24, 240.2, 240.27, 240.23, 375/240.01
See application file for complete search history.

(56) References Cited

U.S. PATENT DOCUMENTS

| | | | | |
|---|---|---|---|---|
| 5,428,396 A | * | 6/1995 | Yagasaki et al. ............ 348/416 |
| 5,502,493 A | * | 3/1996 | Meyer ........................ 348/426 |
| 5,508,942 A | * | 4/1996 | Agarwal ...................... 348/396 |
| 5,719,631 A | * | 2/1998 | Pandel ................... 375/240.15 |
| 5,748,789 A | * | 5/1998 | Lee et al. .................... 382/243 |

(Continued)

FOREIGN PATENT DOCUMENTS

DE    WO 96/32 717 A1    10/1996

(Continued)

OTHER PUBLICATIONS

MPEG Incorporated Association TV Society, 2$^{nd}$ edition, pp. 83-85, Apr. 1996, Oom Publishing Company.

(Continued)

*Primary Examiner*—Shawn S. An
(74) *Attorney, Agent, or Firm*—Sughrue Mion, PLLC

(57) ABSTRACT

A method of representing encoding or non-encoding by extending a video information field of a block when coding video information, is provided. The method of representing encoding or non-encoding by extending an information field for representing encoding or non-encoding is applied to an error allowable mode. Also, the amount of bits depending on the characteristics of video information to be encoded can be reduced. In this method, an image is encoded by extending a code (COD) field which is used in H.263 and MPEG-4 to indicate the cases where neither a motion vector (MV) nor a discrete cosine transform (DCT) value are encoded, where both the MV and the DCT value are encoded, and where only the MV is encoded. Therefore, in a channel with errors, the extended OCD field can be used in the error allowable mode. Also, video information can be encoded using a smaller amount of bits where the motion of an image is constant, than in the conventional art.

2 Claims, 1 Drawing Sheet

U.S. PATENT DOCUMENTS

| | | | | |
|---|---|---|---|---|
| 5,790,196 | A | * | 8/1998 | Sun et al. .................... 348/419 |
| 5,847,763 | A | * | 12/1998 | Matsumura et al. ........ 348/416 |
| 5,896,176 | A | * | 4/1999 | Das et al. ................... 348/416 |
| 5,946,043 | A | * | 8/1999 | Lee et al. .................... 348/420 |
| 6,097,842 | A | * | 8/2000 | Suzuki et al. ............... 348/405 |

FOREIGN PATENT DOCUMENTS

| | | |
|---|---|---|
| DE | WO 97/26 744 A2 | 7/1997 |
| JP | 4-144494 | 5/1992 |
| JP | 4-144496 | 5/1992 |
| JP | 4144494 A | 5/1992 |
| JP | 6-78295 | 3/1994 |

OTHER PUBLICATIONS

Iwadare Yosihiro, "Introduction to Coding Theory", first edition, Dec. 1992, pp. 3-7.

MPEG—pp. 9-13.

* cited by examiner

"0" : (MV/DCT) ENCODING
"1" : (MV/DCT) NON-ENCODING

"1 1" : (MV/DCT) ENCODING
"0 0" : (MV/DCT) NON-ENCODING
"0 1" : (MV ONLY) ENCODING

METHOD FOR REPRESENTING ENCODING UPON CODING INFORMATION

CROSS REFERENCE TO RELATED APPLICATIONS

This application is an application filed under 35 U.S.C. § 111(a), claiming benefit pursuant to 35 U.S.C. § 119(e)(1) of the filing date of the Provisional Application, No. 60/067,014, filed Dec. 1, 1997, pursuant to 35 U.S.C. § 111(b).

BACKGROUND OF THE INVENTION

1. Field of the Invention

The present invention relates to a method for coding video information, and more particularly, to a method which represents that the video information has been encoding or non-encoding according to certain parameters by extending a video information field. Furthermore, the present invention relates to a method of reducing the amount of video bits, by which a method of representing encoding or non-encoding by the extension of an information field for representing encoding or non-encoding can be applied to an error allowable mode, and by which the amount of bits depending on the characteristics of video information to be coded can be reduced.

2. Description of Related Art

In the case of a block-based codec, an object-based codec, or a shape-based codec, a general technique for encoding a moving picture is as follows. A motion vector designates a block of a previous frame which is most similar to a current block, and a real value or a modified value (e.g., DCT) with respect to the difference between real data of the current and previous blocks are encoded to produce data, so that a block is encoded.

In H.263 and MPEG-4, a "COD (code)" field is used to designate whether a motion vector and a DCT are encoded in the bit stream.

FIG. 1 is a conceptual view showing a method of representing encoding and non-encoding in a general bit stream.

As shown in FIG. 1, whether a motion vector MV and a DCT coefficient are encoded or not is represented by a one-bit value of a COD field. That is, if the bit of the COD field is "0", it indicates that the MV and the DCT are encoded, but if the bit thereof is "1", it indicates that they are not encoded.

However, when the encoding or non-encoding of a block is designated by using the COD field, this information is represented by only one bit. Thus, in some cases when this one bit is used in a channel having an error, the entire information is easily misinterpreted due to only the error of one bit.

Also, in the case of an image motion on a predetermined background, only the motion vector (MV) is required during actual encoding and the difference value (DCT) is not needed. In the conventional technique, the difference value (DCT) is also encoded to thereby cause an increase in the amount of bits.

SUMMARY OF THE INVENTION

An object of the present invention is to provide a method of representing encoding upon encoding video information, by which misinterpretation can be prevented when video information is transmitted in a channel with an error by extending a "COD" field used in a bit stream.

Another object of the present invention is to provide a method of representing encoding upon encoding video information, by which data, obtained by encoding the motion of an image in a smaller amount than in the conventional art with respect to constant video motion information, is generated by extending the "COD" field used in a bit stream.

According to the present invention, there is provided a method for representing encoding when video information is coded, characterized in that an image is encoded by extending a code (COD) field to indicate the cases where neither a motion vector (MV) nor a discrete cosine transform (DCT) value are encoded, where both the MV and the DCT value are encoded, and where only the MV is encoded.

Preferably, the extended code field comprises at least two bits.

Preferably, the extended code field is used in H.263 or MPEG-4 encoding standards.

Preferably, when the COD field has a bit value of "11", it indicates that neither the MV nor the DCT value are encoded, when the COD field has a bit value of "00", it indicates that both the MV and the DCT are encoded, and when the COD field has a bit value of "01", it indicates that only the MV is encoded.

Preferably, when an error exists in a channel, only the two values of "00" and "11" are used in an error allowable mode.

Preferably, when packetized data is divided and transmitted in the error allowable mode, the number of "1" of the COD field in a packet is encoded using variable length coding (VLC) and transmitted before the COD field without transmitting the original COD, and when the combined code has a bit value of "00", "0" is transmitted, and when the combined code has a bit value of "11", "1" is transmitted, and in the cases of the other combinations, the original codes of VLC and COD are transmitted without change.

Preferably, information is encoded by using only MV, when motion of an image is constant.

BRIEF DESCRIPTION OF THE DRAWINGS

The above objects and advantages of the present invention will become more apparent by describing in detail a preferred embodiment thereof with reference to the attached drawings in which.

DESCRIPTION OF THE INVENTION

Figure 1:
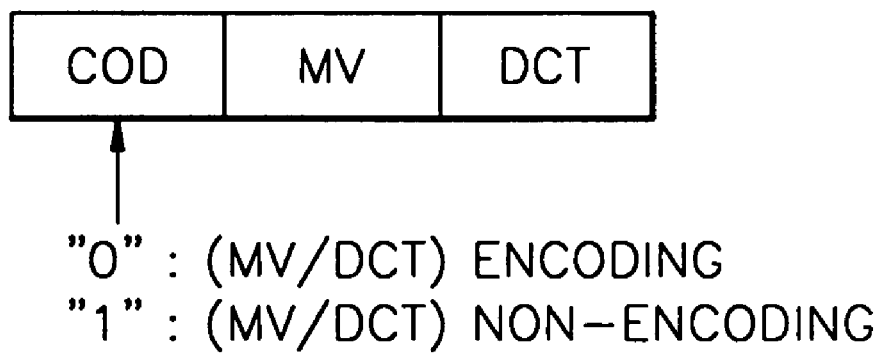
FIG. 1 is a conceptual view showing a method for representing encoding and non-encoding in a general bit stream.
Figure 2:
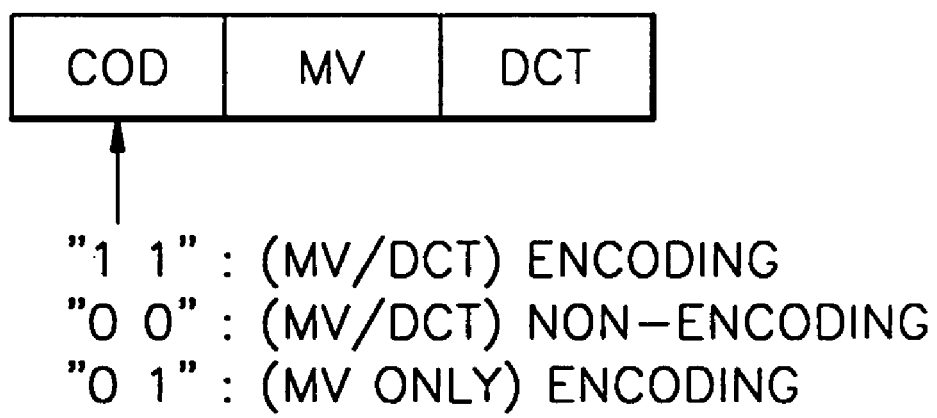
FIG. 2 is a conceptual view showing a method for representing encoding and non-encoding in a bit stream according to the present invention.

As shown in FIG. 2, extending the COD field by one bit results in a reduction of the probability of decoding erroneous COD information, and also allows for the generation of a smaller amount of data than in the conventional art with respect to an image which can sufficiently represent information by using only a motion vector. That is, the COD field represents not only the encoding or non-encoding of two representative values but also a case when only a motion vector, among the two representative values, is required. For this, the COD field is 2 bit-tabled. That is, "11" of the 2 bits indicates that neither MV nor DCT is encoded, "00" indicates that both the MV and DCT are encoded, and "01" indicates that only the MV is encoded. Here, although not specifically used in this embodiment, it can be recognized that "10" may indicate that only the DCT is encoded.

When a video codec performs encoding in an error allowable mode via this expression of the COD, only two values of "00" and "11" are used to prevent defective transmission of "01". In this way, misinterpretation is less likely to occur in a channel with errors than in the case where the COD is represented using one bit.

Also, when a segment of packetized data is divided and transmitted in the error allowable mode, the following method can be used. That is, the number "1" of the COD in a packet is encoded using variable length coding (VLC) and transmitted before the COD. Here, when the combined codes are both expressed by "00", "0" is transmitted, and when those are expressed by "11", "1" is transmitted. The original COD is not transmitted. In the residual cases, the original codes of VLC and COD are transmitted without change. Thus, the information field of the COD is extended to be more robustly applied to the error allowable mode.

The present invention is not limited to the above-described embodiment, and it is apparent that modifications may be effected by those skilled in the art within the spirit of the present invention. For example, it is apparent to those skilled in the art that the COD field can be expressed by 2 bits or more in the method of representing encoding when coding video information. Also, determination of a channel with errors, and determination of whether an image moves under a constant background, are obvious to those skilled in the art, so they will not be described in detail. Here, these two determinations are applied to the method of representing encoding when coding video information.

According to the present invention as described above, in a channel with errors, a COD field is extended, and the extended COD field can be used in an error allowable mode. Also, video information can be encoded using a smaller amount of bits where an image makes a regular movement on a background, than in the conventional art.

What is claimed is:

1. A method for use in a system in which information is transmitted, said method comprising the steps of:
    generating an extended code (COD) field representing a coding state of said information;
    including, in said extended code field, a bit stream indicating whether both a motion vector (MV) and a discrete cosine transform (DCT) value are not encoded, whether both the MV and the DCT are encoded, and whether only the MV is encoded, wherein said extended code field comprises at least two bits, and wherein the COD field having a bit value of "11" indicates that neither the MV nor the DCT value are encoded, the COD field having a bit value of "00" indicates that both the MV and the DCT are encoded, and the COD field having a bit value of "01" indicates that only the MV is encoded; and
    wherein where an error exists in a channel, only the values of "00" and "11" are used in an error allowable mode.

2. The method of claim 1, wherein when packetized data is divided and transmitted in the error allowable mode, the number of "1" of the COD field in a packet is encoded using variable length coding (VLC) and transmitted before the COD field without transmitting the original COD and when the combined code has a bit value of "00", "0" is transmitted, and when the combined code has a bit value of "11", "1" is transmitted, and in the cases of other combinations, the original codes of VLC and COD are transmitted without change.

* * * * *